United States Patent
Konishi (10) Patent No.: US 7,496,427 B2
(45) Date of Patent: Feb. 24, 2009

(54) MOLDING MACHINE AND MOLDING MACHINE MANAGEMENT SYSTEM

(75) Inventor: Toshio Konishi, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/517,370

(22) Filed: Sep. 8, 2006

(65) Prior Publication Data

US 2007/0009627 A1  Jan. 11, 2007

Related U.S. Application Data (63) Continuation of application No. PCT/JP2005/003977, filed on Mar. 8, 2005.

(30) Foreign Application Priority Data

Mar. 9, 2004  (JP)  ............................... 2004-065920

(51) Int. Cl.
B29C 47/92  (2006.01)

(52) U.S. Cl. ..................... 700/197; 425/167; 425/135

(58) Field of Classification Search ................. 700/197, 700/17, 83, 180, 51, 2, 120; 701/101, 200; 425/162, 132; 709/203; 707/10
See application file for complete search history.

(56) References Cited

U.S. PATENT DOCUMENTS

| | | | |
|---|---|---|---|
| 6,311,101 B1 * | 10/2001 | Kastner | 700/197 |
| 2002/0031567 A1 * | 3/2002 | Magario | 425/135 |
| 2004/0093114 A1 * | 5/2004 | Magario et al. | 700/197 |
| 2005/0256874 A1 * | 11/2005 | Chiba et al. | 707/10 |

FOREIGN PATENT DOCUMENTS

| | | |
|---|---|---|
| JP | 10-113965 | 5/1998 |
| JP | 2002-086531 | 3/2002 |
| JP | 2002-307512 | 10/2002 |
| JP | 2003-191284 | 7/2003 |
| WO | WO 99/01806 | 1/1999 |

* cited by examiner

*Primary Examiner*—Kidest Bahta
(74) *Attorney, Agent, or Firm*—Squire, Sanders & Dempsey L.L.P.

(57) ABSTRACT

A molding machine includes a control part incorporating a specific server program and a memory part saving internal data of the molding machine. The specific server program transmits the internal data, which is converted into a predetermined format and stored in the memory part, to a network.

10 Claims, 8 Drawing Sheets

| DATA/TIME | SHOT COUNTER | CYCLE TIME | FILL TIME | METERING TIME | PRESS. HOLD SCREW | FILL TIME 1 | MINIMUM CUSHION | PRESS. HOLD END POSITION | VP SWITCH POSITION | FILL FRONT POSITION | FILL PEAK PRESS. |
|---|---|---|---|---|---|---|---|---|---|---|---|
| 03/09/22 19:30 | 54 | 5.7 | 0.08 | 0.13 | 0.00 | 0.09 | 14.53 | 14.77 | 14.99 | 22.00 | 140 |
| 03/09/22 19:29 | 53 | 5.7 | 0.08 | 0.13 | 0.00 | 0.09 | 14.55 | 14.84 | 14.98 | 22.00 | 141 |
| 03/09/22 19:29 | 52 | 5.7 | 0.08 | 0.14 | 0.00 | 0.09 | 14.54 | 14.84 | 14.98 | 22.00 | 136 |
| 03/09/22 19:29 | 51 | 5.7 | 0.08 | 0.13 | 0.00 | 0.09 | 14.55 | 14.81 | 14.98 | 22.00 | 140 |
| 03/09/22 19:29 | 50 | 5.7 | 0.08 | 0.14 | 0.00 | 0.09 | 14.53 | 14.76 | 14.98 | 22.00 | 141 |
| 03/09/22 19:29 | 49 | 5.7 | 0.08 | 0.13 | 0.00 | 0.09 | 14.52 | 14.80 | 14.97 | 22.00 | 140 |
| 03/09/22 19:29 | 48 | 5.7 | 0.08 | 0.12 | 0.00 | 0.09 | 14.52 | 14.90 | 14.97 | 22.00 | 140 |
| 03/09/22 19:29 | 47 | 5.7 | 0.08 | 0.13 | 0.00 | 0.09 | 14.51 | 14.87 | 14.99 | 22.00 | 141 |
| 03/09/22 19:29 | 46 | 5.7 | 0.08 | 0.13 | 0.00 | 0.09 | 14.63 | 14.98 | 14.97 | 22.00 | 140 |
| 03/09/22 19:29 | 45 | 5.7 | 0.08 | 0.15 | 0.00 | 0.09 | 14.62 | 15.00 | 15.00 | 22.00 | 141 |
| 03/09/22 19:28 | 44 | 5.7 | 0.08 | 0.11 | 0.00 | 0.09 | 14.54 | 14.80 | 14.99 | 22.00 | 140 |
| 03/09/22 19:28 | 43 | 5.7 | 0.08 | 0.12 | 0.00 | 0.09 | 14.53 | 14.99 | 14.98 | 22.00 | 141 |
| 03/09/22 19:28 | 42 | 5.7 | 0.08 | 0.14 | 0.00 | 0.09 | 14.52 | 14.84 | 14.99 | 22.00 | 141 |
| 03/09/22 19:28 | 41 | 5.7 | 0.08 | 0.13 | 0.00 | 0.09 | 14.53 | 14.76 | 14.98 | 22.00 | 141 |
| 03/09/22 19:28 | 40 | 5.7 | 0.08 | 0.12 | 0.00 | 0.09 | 14.51 | 14.88 | 14.98 | 22.00 | 141 |
| 03/09/22 19:28 | 39 | 5.7 | 0.08 | 0.13 | 0.00 | 0.09 | 14.51 | 14.92 | 14.97 | 22.00 | 141 |
| 03/09/22 19:28 | 38 | 5.7 | 0.08 | 0.13 | 0.00 | 0.09 | 14.52 | 14.83 | 14.97 | 22.00 | 141 |
| 03/09/22 19:28 | 37 | 5.7 | 0.08 | 0.13 | 0.00 | 0.09 | 14.62 | 14.91 | 14.99 | 22.00 | 140 |
| 03/09/22 19:28 | 36 | 5.7 | 0.08 | 0.15 | 0.00 | 0.09 | 14.62 | 14.98 | 14.99 | 22.00 | 140 |
| 03/09/22 19:28 | 35 | 5.7 | 0.08 | 0.12 | 0.00 | 0.09 | 14.55 | 14.78 | 15.00 | 22.00 | 141 |
| 03/09/22 19:28 | 34 | 5.7 | 0.08 | 0.13 | 0.00 | 0.09 | 14.53 | 14.87 | 14.97 | 22.00 | 140 |
| 03/09/22 19:28 | 33 | 5.7 | 0.09 | 0.12 | 0.00 | 0.09 | 14.61 | 15.05 | 14.99 | 22.00 | 141 |
| 03/09/22 19:27 | 32 | 5.7 | 0.08 | 0.14 | 0.00 | 0.09 | 14.63 | 14.98 | 14.99 | 22.00 | 140 |
| 03/09/22 19:27 | 31 | 5.7 | 0.08 | 0.13 | 0.00 | 0.09 | 14.63 | 14.91 | 14.97 | 22.00 | 140 |
| 03/09/22 19:27 | 30 | 5.7 | 0.08 | 0.12 | 0.00 | 0.09 | 14.61 | 14.99 | 14.98 | 22.00 | 140 |
| 03/09/22 19:27 | 29 | 5.7 | 0.09 | 0.14 | 0.00 | 0.09 | 14.58 | 14.90 | 14.99 | 22.00 | 140 |
| 03/09/22 19:27 | 28 | 5.7 | 0.08 | 0.12 | 0.00 | 0.09 | 14.59 | 14.88 | 14.99 | 22.00 | 140 |
| 03/09/22 19:27 | 27 | 5.7 | 0.08 | 0.14 | 0.00 | 0.09 | 14.60 | 14.85 | 14.98 | 22.00 | 140 |

# MOLDING MACHINE AND MOLDING MACHINE MANAGEMENT SYSTEM

CROSS-REFERENCE TO RELATED APPLICATION

This application is a U.S. continuation application, filed under 35 USC 111(a) and claiming the benefit under 35 USC 120 and 365(c), of PCT application JP2005/003977 filed Mar. 8, 2005. The foregoing application is hereby incorporated herein by reference.

BACKGROUND OF THE INVENTION

1. Field of the Invention

The present invention relates to molding machines and, more particularly, to a molding machine connected to a network to be capable of performing communication with external equipments and a molding machine management system using such a molding machine.

2. Description of Related Art

In a molding factory, internal data, such as molding condition data required each time a mold of a molding machine is changed, performance value (logging) data used for determination of molded products or waveform data, is retrieved outside injection molding machines, and accumulated in an external memory apparatus. It is an important element for management of a molding factory to retrieve data regarding a molding machine from the molding machine and manage it.

Moreover, if molding condition data regarding a molding machine for molding a molded product can be transferred to other molding machines, which mold the same molded product, a setting work of molding condition becomes easy. Conventionally, internal data of a molding machine, such as molding condition data, performance value data, waveform data, is retrieved outside the molding machine through memory media.

Storage capacity of a memory media such as a disk recording medium or a memory card is limited, and a large amount of data cannot be recorded in a lump sum. Additionally, it takes a considerable time to record data on a memory medium when retrieving internal data of a molding machine.

When changing operation program software incorporated in a molding machine, an operation program is changed by replacing a ROM body or a readable and writable silicon disk body on which the operation program of the molding machine is recorded. Therefore, when changing an operation program of a molding machine located at a remote place, the program cannot be sent through a communication means such as a network or the like, and a recording medium on which the operation program is recorded must be sent to the remote place. Thus, it takes a long time to carry out maintenance, and a cost expended for the maintenance of the molding machine is increased.

It should be noted that when exchanging data between a molding machine and an external equipment, there is known a data operation according to a communication program using RS232C, OPC or SPI standard. (for example, refer t Patent Document 1). However, it is necessary to determine a communication specification to perform mutual data communication between the molding machine and the external equipment, and a communication program for a molding machine which operates on the external equipment with respect to the external equipment to be connected.

Patent Document 1: Japanese Laid-Open Patent Application No. 10-113965

SUMMARY OF THE INVENTION

It is a general object of the present invention to provide a novel and useful molding machine and molding machine management system in which the above-mentioned problems are eliminated.

A more specific object of the present invention is to enable acquisition of internal data from an external terminal apparatus such as a personal computer or the like by using a well-known server program such as FTP server program, HTTP server program or the like.

It is another object of the present invention to reduce a burden of maintenance work of an operator by enabling checking of various kinds of internal data stored in a molding machine from an external terminal apparatus.

There is provided according to one aspect of the present invention a molding machine comprising: a control part incorporating a specific server program; and a memory part saving internal data of the molding machine, wherein the specific server program transmits the internal data, which is converted into a predetermined format and stored in the memory part, to a network.

The specific server program is preferably an HTTP server program or an FTP server program. Additionally, the internal data may be converted into HTML file data by the HTTP server program. When the control part incorporates therein a molding operation program for controlling an operation, the internal data may be converted into HTML file data by the molding machine operation program.

Additionally, the internal data may contain at least one kind of molding condition data, performance value data, waveform data, molding machine state data, instruction manual data, and molding machine specification list data. The instruction manual data and the molding machine specification list data may be the fixed HTML file data by said HTTP server program, and the molding condition data, the performance value data, the waveform data and the molding state data may be converted into the HTML file data by the molding operation program.

Additionally, the internal data may be screen data displayed on a display part.

The external terminal apparatus may be an external computer, and incorporates therein an HTTP server program as the specific server program, and the external computer may be provided with a Web browser program. Alternatively, the external terminal apparatus may be an external computer, and incorporates therein an FTP server program as the specific server program, and the external computer may be provided with an FTP external program.

The external terminal apparatus and the control part may be capable of performing bi-directional communication therebetween, and may be configured to be capable of updating the molding machine operation program by being sent from the external terminal apparatus to the control part side.

There is provided according to another aspect of the present invention a molding machine management system comprising: a molding machine having a control part incorporating a specific server program and a memory part storing internal data of the molding machine; an external terminal apparatus displaying and managing the internal data transmitted from the molding machine; and a communication line connecting the molding machine and the external terminal apparatus, wherein the specific server program transmits the internal, which is converted into a predetermined format and stored in the memory part, to the communication line.

According to the present invention, by incorporating a server function into a molding machine such as an injection machine or the like, communication between the molding machine and the server can be performed directly within the molding machine without going through a network. Accordingly, there is no interruption between a control part of the molding machine and the server, and the reliability of the data transmission can be improved.

Other objects, features and advantages of the present invention will become more apparent from the following detailed description when read in conjunction with the accompanying drawings.

BRIEF DESCRIPTION OF THE DRAWINGS

FIG. 4 is an illustration showing a display example of performance value data when referring to internal data of the injection molding machine by the external equipment;

DETAILED DESCRIPTION OF THE PREFERRED EMBODIMENTS

Figure 1:
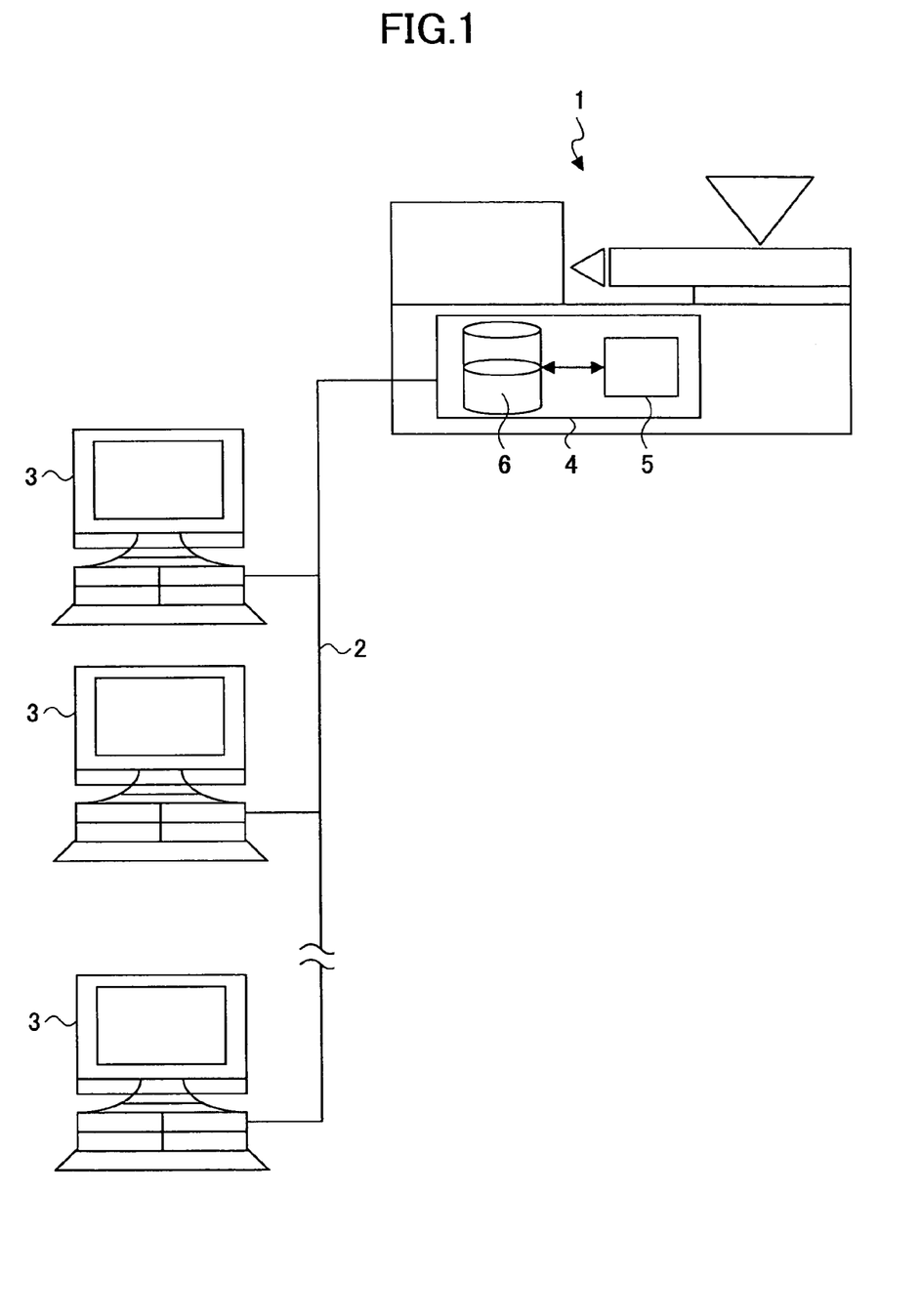
FIG. 1 is an illustration showing a connection between an injection molding machine as a molding machine to which the present invention is applied and external equipments.

First, a description will be given, with reference to FIG. 1, of a connection relationship between a molding machine to which the present invention is applied and an external equipment. FIG. 1 is an illustration showing an injection molding machine 1 to which the present invention is applied and an external equipment 3. A molding machine management system is constituted by the molding machine 1, a communication line (network) 2 and the external equipment 3.

The injection molding machine 1 to which the present invention is applied is connected to a personal computer 3, which is the external equipment, through a network 2 such as the Ethernet (registered trademark). Although a server apparatus is provided between the personal computer 3 and the injection molding machine 1 conventionally, the injection molding machine 1 to which the present invention is applied has a server function inside, and there is no need to provide a server apparatus.

Conventionally, the injection molding machine 1 was managed by the server apparatus. That is, data regarding the injection molding machine 1 is accumulated in the server apparatus, and, in order to acquire the data regarding the injection molding machine 1 from an external equipment such as the personal computer 3, it is configured and arranged to acquire desired data by accessing the server apparatus. In this case, data such as molding conditions acquired by the injection molding machine 1 must be transmitted to the server apparatus. For example, if a failure occurs in the communication between the server apparatus and the injection molding machine 1, the data of the injection molding machine 1 cannot be transmitted to the server apparatus, and the data of the injection molding machine 1 cannot be acquired from an external equipment such as the personal computer 3.

Thus, in the present invention, as shown in FIG. 1, a server function part 5 and a memory part 6 are provided in a controller 4 of the injection molding machine 1 so that the injection molding machine itself has a server function. Thereby, there is no need to provide an independent server apparatus on the network 2 between the injection molding machine 1 and the personal computer 3, and communication between the injection molding machine 1 and the server apparatus through the network 2 is not always needed. That is, data is accumulated in the memory part 6 of the injection molding machine 1, and the accumulated data is managed by the server function part 5. Then, the personal computer 3 can access the server function part 5 of the injection molding machine 1 directly so as to retrieve the data from the memory part 6.

Since the server function part 5 and the memory part 6 exchange data by data-transfer within the controller 4, there is no need to establish a communication channel each time such as communication through a network. Accordingly, the reliability of the data transfer within the controller 4 of the injection molding machine 1 is much higher than the reliability of the communication through a server PC, and data loss due to a communication failure can be prevented.

Figure 2:
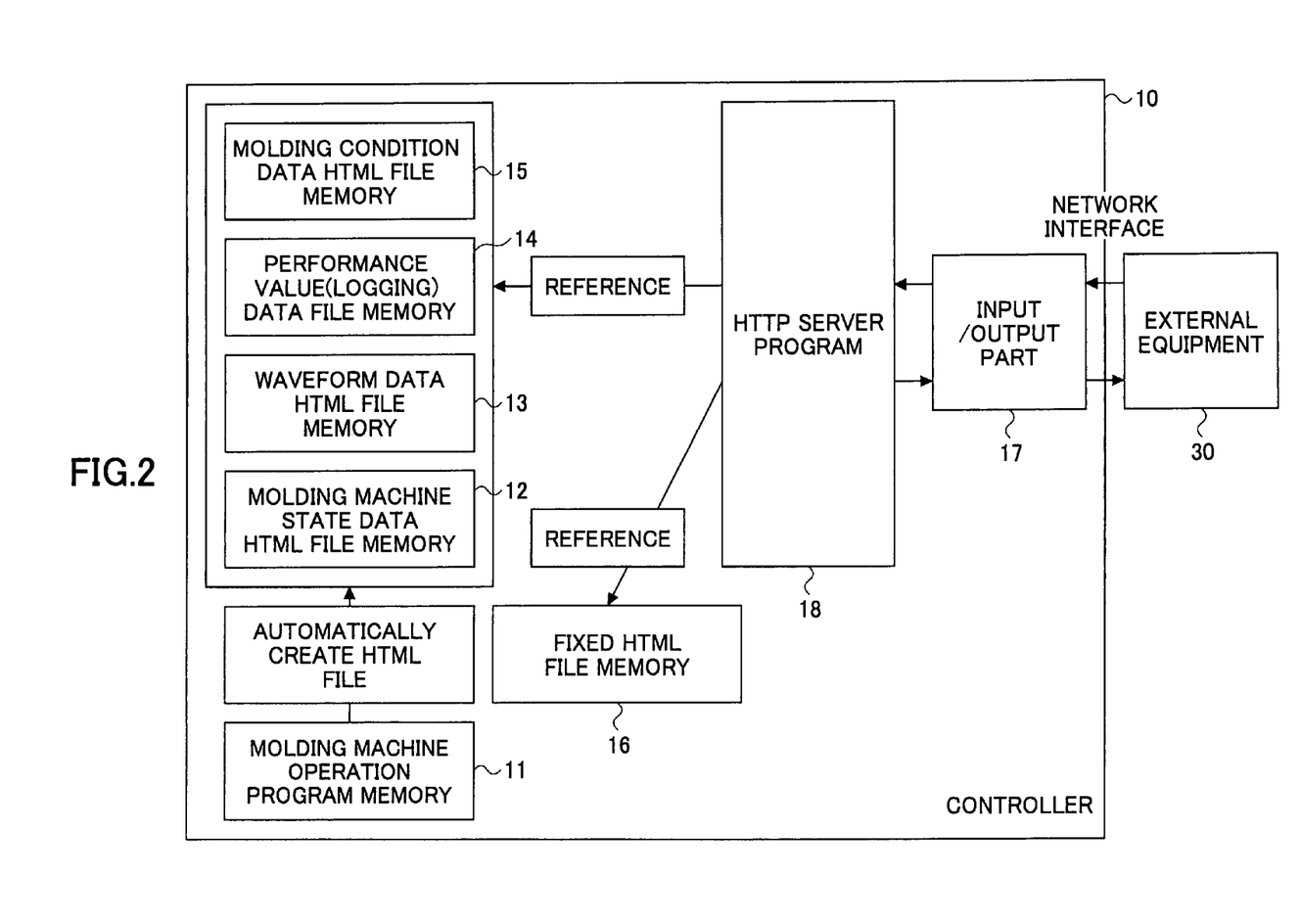
FIG. 2 is a functional block diagram of a controller performing a control operation in an injection molding machine according to a first embodiment of the present invention.

Next, a description will be given, with reference to FIG. 2, of a first embodiment in which the present invention is applied to an injection molding machine. FIG. 2 is a functional block diagram of a controller performing a control operation in an injection molding machine.

In FIG. 2, a controller 10 (corresponding to the controller 4 shown in FIG. 1) has a molding machine program memory 11, which stores a molding machine operation program. The controller 10 comprises, other than the molding machine program memory 11, a molding machine state data HTML file memory 12, a waveform data HTML file memory 13, a performance value (logging) data HTML file memory 14 and a molding condition data HTML file memory 15, as an internal data memory. That is, in the present embodiment, molding machine state data, waveform data, performance (logging) data and molding condition data are assumed as internal data. Besides, instruction manual data for explaining a handling method of the injection molding machine and specification list data indicating specifications of each part of the injection molding machine are saved in a fixed HTML file memory 16. Each of the above-mentioned memories is not needed to be constituted by a separate memory apparatus, and may be achieved by a single memory apparatus.

The controller 10 performs a control operation based on the molding machine operation program read from the molding machine program memory 11. The controller 10 monitors each shot during execution of a control operation by using a plurality of detection signals acquired from a plurality of sensors provided to each of parts to be controlled. Also in the present embodiment, the object to be monitored is not limited to the detection signals acquired from the sensors, and values acquired by calculation with values to be monitored in the controller and the detection values indicated by a detection signal are together handled as performance values.

The controller 10 is provided with an input/output part 17 for network interface so as to carry out communication with an external equipment (external terminal apparatus) 30, and has an HTTP (Hyper Text Transfer Protocol) server program 18 mounted therein. The HTTP server program 18 accesses each HTML file memory and a fixed HTML file memory 16 in the internal data memory so as to read out or change data stored in the fixed HTML file memory 16. The HTTP server program 18 serves as a server function part 5 in FIG. 1.

Here, the HTTP server program is a program which provides a service for enabling browsing HTML files such as a homepage by a browser. If the HTTP server is exhibited on the Internet, HTML files transferred to the HTTP server can be browsed from all over the world through the Internet.

Thus, if the molding machine itself has the HTTP server program 18, the molding machine can be connected directly to the Internet (registered trademark). Therefore, data (HTML file) can be transferred to the external equipment 30 at a remote place from the molding machine by, for example, connecting to the Internet (registered trademark) the external equipment 30, the molding machine installed in the molding-machine factory, and the external equipment 30 (computer) of a management center in the remote place, without building a network such as a LAN for the management apparatus and the molding machine to communicate with each other.

Next, a description will be given of a function of the controller 10 and each part inside the controller 10.

1. The controller 10 performs simultaneously the molding machine operation program and the HTTP server program.

2. With execution of a control operation, the molding machine operation program automatically creates screen link data, such as a molding machine state data file, a waveform data file, a performance value (logging) data file, a molding condition data file, etc., which are molding machine internal data described in HTML format, and saves the created screen link data in the corresponding HTML file memories 12 through 15. It should be noted that the automatic creation of each of the above-mentioned data files may be performed by the HTTP server program 18, or an HTML file creation program, which performs only creation of an HTML file, may be provided so as to perform the file creation.

3. The external equipment 30 is connectable through the controller 10 and the input/output part 17 for network interface.

4. The external equipment 30 is capable of referring to the HTML file memories 12 through 15 located at predetermined addresses in the controller, based on the HTTP communication specification, according to a program (for example, IE of Windows (registered trademark)) which can Web-browse.

5. The external equipment 30 does not only refer to the HTML files which the molding machine operation program creates automatically but also refers to the fixed HTML file in which the instruction manual data, the specification list data of the molding machine are described. The instruction manual data and the molding machine specification list data are fixed data that has been created at a delivery stage.

6. The HTTP server program 18 can transmit the molding condition data HTML file, the waveform data HTML file, the performance value (logging) data HTML file and the like in a memory area of the memory by referring to an HTML file on a file layer of the memory area of the memory.

As explained above, the communication specification of HTTP is also general, and the communication client program thereof is a program, which can be easily acquired in an external equipment such as a computer mounting an operation system such as the Windows (registered trademark), which saves labor of creating the program.

Moreover, the HTTP communication specification also has a very high-level security, and protects the memory inside the controller from an illegal access. By performing communication conforming to the HTTP specification, a large amount of data can be exchanged according to a file format without loss. By setting a unique IP address to each injection molding machine so as to form a communication network form mutually between the injection molding machines, the external equipment can perform communication with a plurality of injection molding machines simultaneously, and central management of internal data of each injection molding machine can be achieved. Additionally, by performing communication using a network interface such as Ethernet (registered trademark), internal data of an injection molding machine of a remote place can be referred to.

A description will now be given of a display example of a case where the external equipment 30 accesses the memory of the controller 10 so as to cause the display of the external equipment 30 to display the internal data.

Figure 3:
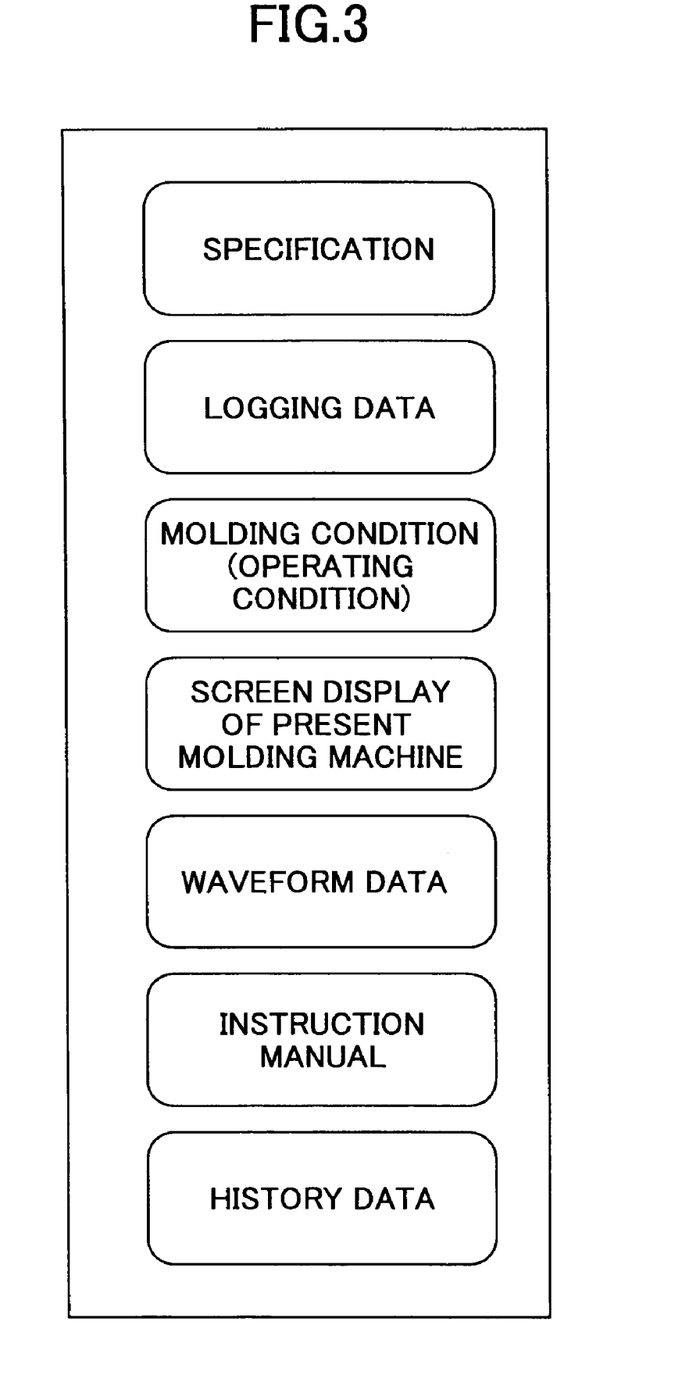
FIG. 3 is an illustration showing a display example of a top page displayed on a display of an external equipment when referring to internal data of the injection molding machine by the external equipment.

FIG. 3 shows a display example of a top page of a Web browser program on the display of the external equipment 30. Displayed on the top page are items regarding specification corresponding to specification list data of the molding machine, logging data corresponding to performance value data, molding condition (operation condition) corresponding to molding condition data, screen display of the present molding machine corresponding to molding machine state data, waveform data, instruction manual corresponding to instruction manual data, history data such as setting history or failure history, etc. By selecting one of the items by clicking by a mouse or through a touch panel, the selected data is read from the memory within the controller 10, and sent to the external equipment 30 so as to be switchably displayed by the display.

Although the specification list data of the molding machine is not illustrated, data regarding kinds of method and numerical values is indicated according to each of a variety of items such as, for example, a molding method, a maximum clamp force, a mold open/close stroke, an ejector method, an ejector stroke, etc. Additionally, mention about a plasticizer apparatus, data such as kinds of methods and numerical values is indicated according to each of a variety of items such as a screen diameter, a maximum injection pressure, a maximum holding pressure, a mass of injection, a screw stroke, etc. Of curse, the specification list data is not limited to the mold clamp apparatus or the plasticizer apparatus.

FIG. 4 shows a display example of performance value data. The performance value data is displayed over a plurality of items of data such as date and time, a shot number, a cycle time, a fill time, etc., associated with a molding operation. Those items are previously determined on the molding machine side, and the display is updated in the screen of the molding machine each time a single shot is completed. It should be noted that although if it is a case of the Windows (registered trademark), a menu such as a task bar, a tool bar, an address bar, etc., is displayed other than data explained in the display screens mentioned below including FIG. 3, an illustration thereof is omitted. Additionally, although scroll bars for horizontal and vertical directions are also displayed on the bottom and side of the screen display, illustrations thereof are also omitted.

Moreover, the data regarding the contents of the display is saved as an HTML file, and the HTTP server program 18 can update the contents of the display automatically. For example, when data is updated during a display of the data, it can set so that the display is automatically changed by incorporating an automatic update program in the HTTP server program 18. For example, when a subsequent shot is completed and internal data of the molding machine is obtained while displaying performance data during an operation of the molding machine as shown in FIG. 4, the molding machine operation program creates an HTML file as data of the above-mentioned items and stores the HTML file in each memory. Then, the automatic update program is run so as to display each item data of the new shot on the screen currently displayed, and the contents of the display are automatically updated. A timing of the automatic update is previously determined, and the timing here is automatically updated for each single shot. Additionally, the function of automatic update can be applied to not only the performance data shown in FIG. 4 but also to a velocity waveform screen or a pressure waveform screen as a waveform screen indicating changes in each detection value acquired from a velocity detector or a pressure detector provided in the molding machine along a coordinate representing a time or a position of a screw.

As mentioned above, by using the HTTP server program, even if an operator does not perform an operation to display newest data, the contents of display can be automatically updated, which improves convenience.

It should be noted tat data regarding the display contents shown in FIG. 4 is stored as a performance value (logging) data HTML file in the performance value (logging) data HTML file memory 14.

Figure 5:
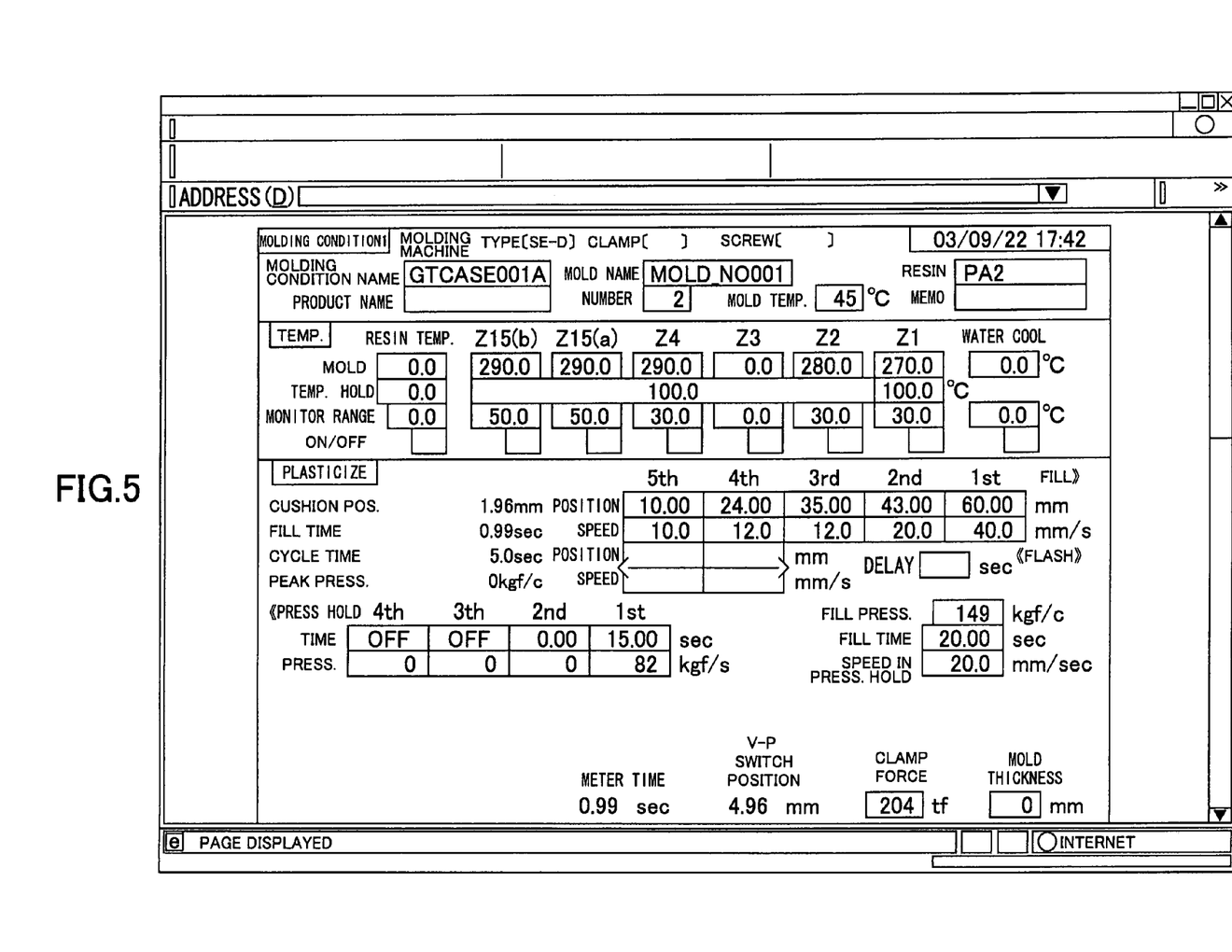
FIG. 5 is an illustration of a display example of molding condition data when referring to internal data of the injection molding machine by the external equipment.

FIG. 5 shows a display example of the molding condition data. A molding condition name, a mold name, a resin name, a product mane, etc., are displayed in an uppermost column of molding condition 1, and a temperature setting value of each part of a heating cylinder is displayed in the column of temperature below thereof. Various setting values regarding injection such as, for example, a cushion position, a fill time, a cycle time, etc., are displayed in a column of plasticize further below. The display of FIG. 4 is merely a part of molding condition data, and a desired molding condition can be viewed by a scroll function.

It should be noted that the data regarding the contents shown in FIG. 5 is stored as a molding condition data HTML file in the molding condition data HTML file memory 15.

Figure 6:
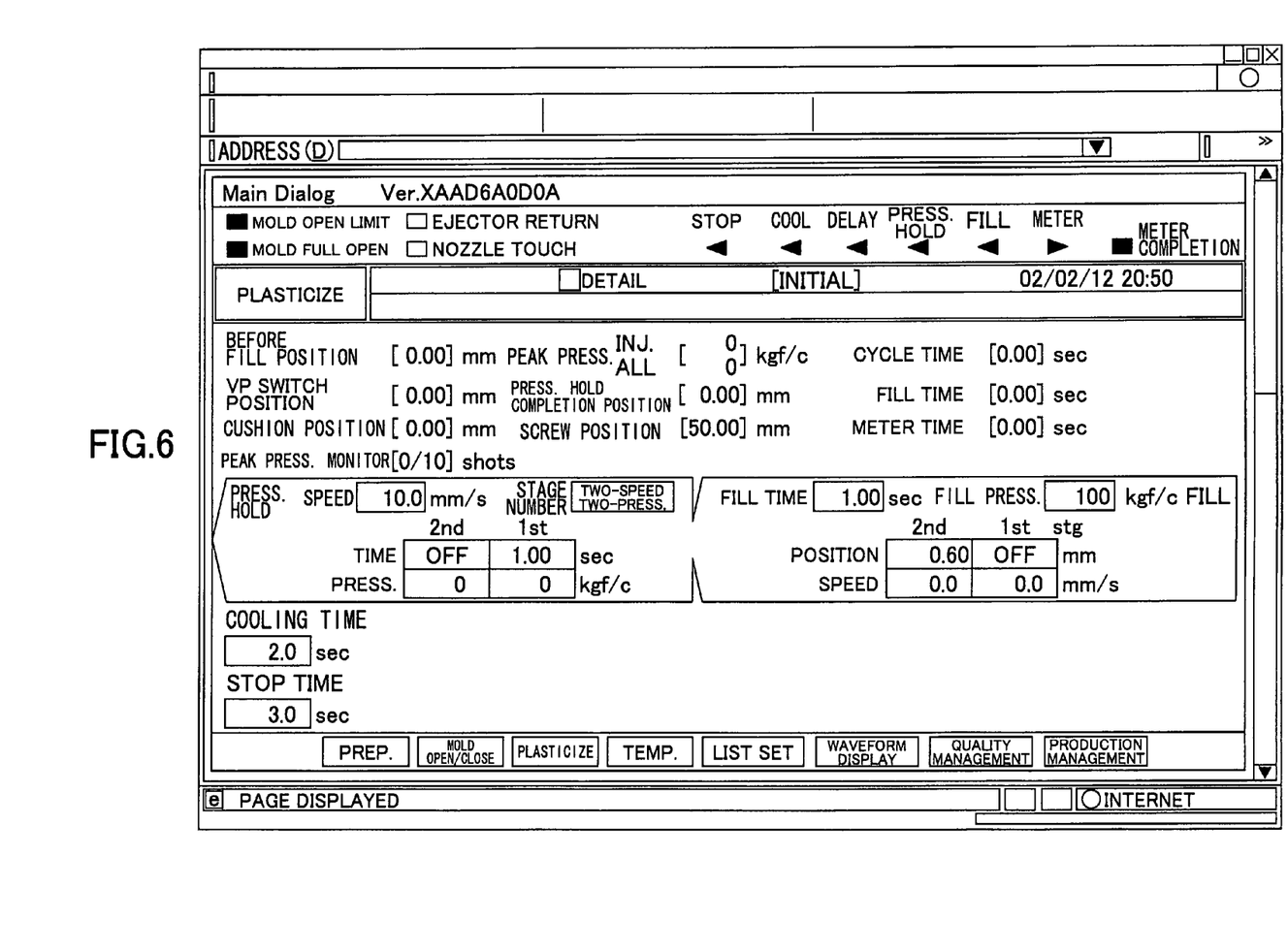
FIG. 6 is an illustration of a present screen display example of the injection molding machine when referring to internal data of the injection molding machine by the external equipment.

FIG. 6 shows a screen display example of the present injection molding machine. In this display screen, a screen selection menu bar for preparation, mold open and close, plasticize, temperature, list setting, waveform display, quality control and product management is provided on a bottom side thereof, and by selecting one of them, it can be switched to a corresponding display screen. In FIG. 6, as a screen of plasticize, numerical values such as a before fill position, a V/P switch position, a cushion position, etc., are displayed.

It should be noted that data regarding the contents shown in FIG. 6 is stored as a molding machine state data HTML file in the molding machine state HTML file memory 12. A setting value to each mechanism of the molding machine and detection values detected by detectors provided to the molding machine are represented in the molding machine state HTML file.

Figure 7:
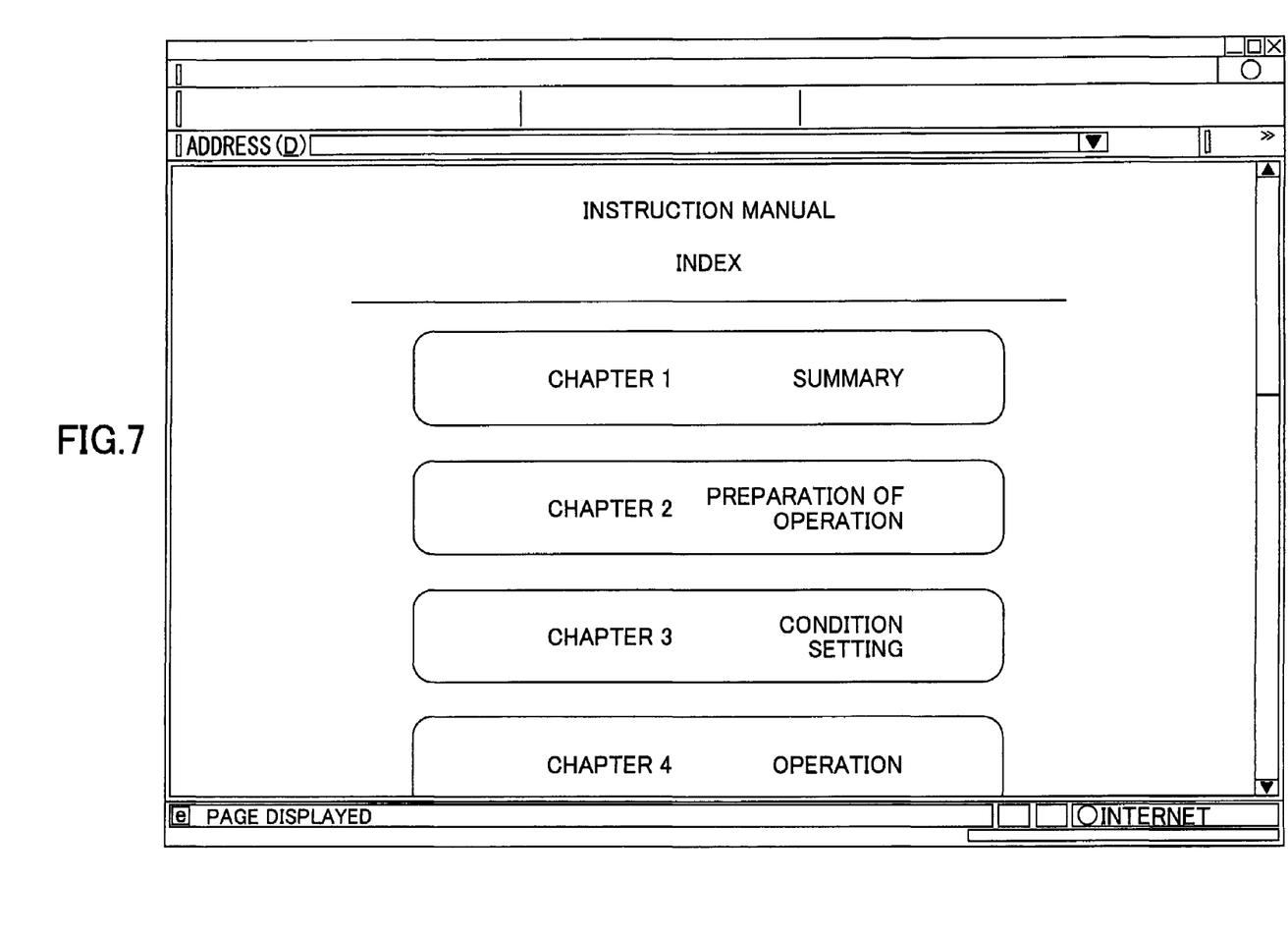
FIG. 7 is an illustration of a screen display example of data for instruction manual when referring to internal data of the injection molding machine by the external equipment.

FIG. 7 is a screen display example of instruction manual data. Here, an index of the instruction manual such as, for example, first chapter as summary, second chapter as preparation of operation, third chapter as condition setting, etc., is displayed, and by selecting one of them, the contents of the chapter are displayed for each page. Turn over of page can be achieved by a scroll function. Further, since the index screen shown in FIG. 7 is an HTML file, the display screen can be switched to a previously linked screen by clicking an arbitrary position. For example, by clicking the "second chapter: preparation of operation", the index screen can be changed into an operation preparation screen. Thus, even the instruction manual usually delivered by an injection molding machine maker as a printed matter by papers can be stored in a memory inside the injection molding machine, which reduces an amount of papers used. Further, usually in a molding site, a printer is located in a management room in which a personal computer 3 is located. Thus, data of the injection molding machine can be printed out by locating the personal computer 3 near the printer, which improves convenience at the molding site.

It should be noted that the data regarding the contents shown in FIGS. 6 and 7 is stored as a fixed HTML file in the fixed HTML file memory 16.

Next, a description will be given of a procedure of acquiring data from the injection molding machine according to the first embodiment of the present invention.

First, an operator performs an input of an address of the injection molding machine through the external equipment which is a management apparatus so as to designate an injection molding machine of which data is to be acquired, and logs in the controller 10 of the injection molding machine. In order to improve security of access to the controller 10, it may be configured to require an input of a password or an ID when logging in.

After logged in the controller 10, the top page shown in FIG. 3 is displayed on a screen of the external equipment 30. If the operator selects an item to be checked from among items displayed on the top page, the screen link data at the time of access stored in the selected HTML file memory is transmitted to the external equipment 30, and the contents thereof are displayed on the external equipment 30. The transmitted data may be not only real time screen link data but also may include molding condition data and instruction manual data, specification list data showing specifications of each part of the injection molding machine. Here, the specification list data may include customize data which represents how the specifications of an injection molding machine are caused to conform for each individual molding factory. Further, work procedure data showing a treatment method when failure occurs may be stored. Accordingly, based on the screen information, the operator can check quickly the internal data of the injection molding machine. Further, since a server program is incorporated in each injection molding machine, a plurality of personal computers 3 can access simultaneously the same injection molding machine. Therefore, convenience in the molding site can be remarkably improved.

Moreover, since the molding machine operation program memory 11 is incorporated in the molding machine and the molding machine operation program memory 11 automatically creates an HTML file, even if a failure occurs, for example, on the Internet (registered trade mark) and a communication is temporarily interrupted, data can be saved as an HTML file in the molding machine and the data saved as the HTML file can be read after the communication is restored.

Therefore, after converting each item of the internal data of the molding machine into HTML files, it is not necessary to save the internal data and the internal data can be eliminated from the memory. Thereby, it is not necessary to save the internal data having a large data size, which reduces a memory size.

Moreover, since internal data is converted into an HTML file immediately after the internal data is generated, if a communication interruption of a network occurs, there is no influence given to the conversion of the HTML file. Accordingly, in a case where, for example, contents of display data are abnormal, there is an extremely small possibility of abnormality of display contents due to a communication interruption, and it can be determined that the abnormality is caused by an actual failure in the molding machine.

Figure 8:
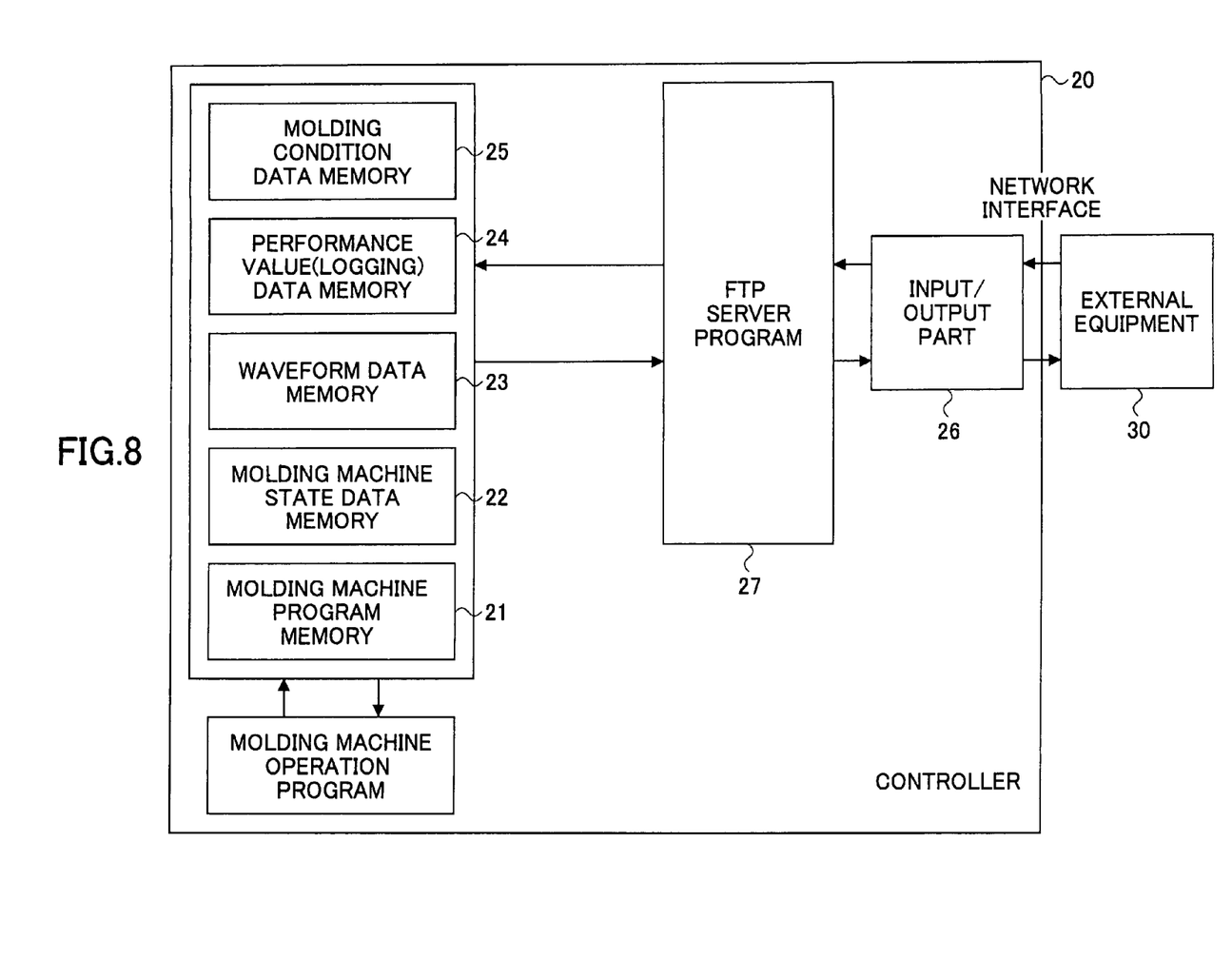
FIG. 8 is a functional block diagram of a controller performing a control operation in an injection molding machine according to a second embodiment of the present invention.

Next, a description will be given, with reference to FIG. 8, of a second embodiment in which the present invention is applied to an injection molding machine. FIG. 8 is a functional block diagram of a controller, which performs a control operation in the injection molding machine. The controller 20 comprises, as internal data memories other than a molding machine program memory 21, a molding machine state data memory 22, a waveform data memory 23, a performance value (logging) data memory 24 and a molding condition data memory 25. That is, in the present embodiment, as the internal data of the injection molding machine, molding machine state data, waveform data, performance value (logging) data and molding condition data are assumed. Besides, the instruction manual data for handling of the injection molding machine, specification list data indicating the specification of each part of the injection molding machine, and the like are stored as the internal data, but illustrations of those memories for the internal data are omitted. It should be noted that it is not necessary to constitute each of the above-mentioned memories as an individual memory device, and may be achieved by a single memory device.

The controller 20 performs a control operation based on the molding machine operation program read from the molding machine program memory 21. The controller 20 performs management and control for each shot using a plurality of detection signals acquired from a plurality of sensors provided to each of parts to be controlled during execution of a control operation. It should be noted that the object to be monitored in the injection molding machine is not limited to the detection signals acquired from the sensors. That is, in the injection molding machine, there is a case in which a value as an object to be monitored is calculated at each time and monitors the calculated values. A sum of the thus-calculated value and the detection value indicated by the detection signal is referred to as a performance value in the present invention.

The controller 20 comprises an input/output part 26 for network interface so as to perform communication with an external equipment (external terminal apparatus) 30 such as a personal computer through a network such as Ethernet (registered trademark), and has an FTP (File Transmission Protocol) server program 27. An FTP client program is mounted to the external equipment 30. The FTP server program 27 accesses the internal data memories 21 to 25 so as to perform read-out or rewrite of the internal data.

A description will be given below of the controller 20 and a function of each part of the controller 20.

1. The controller 20 performs simultaneously the molding machine operation program and the FTP server program.

2. The molding machine operation program creates the performance value (logging) data, the molding condition data, the waveform data, molding machine state data, etc., associated with execution of a control operation, and saves in each memory of the internal data memories.

3. The external equipment 30 is enabled to be connected to the controller 20 through the input/output part 26 for network interface.

4. The external equipment 30 requests permission of communication to the FTP server program according to the FTP communication specification.

5. The FTP server program 27 is capable of applying a security so that not any one can review the internal data by requesting the external equipment 30 an account name input and a password input.

6. After password check, the FTP server program 27 performs communication permission of the external equipment 30, and, thereby, the external equipment 30 can refer to the internal data of the injection molding machine.

7. The external equipment 30 does not only refer to the internal data of the injection molding machine but can make a change of the data. For example, although the instruction manual data, the molding machine specification list data, etc., are fixed data created in a delivery stage, there is a possibility of changes in the contents thereof, and in such a case, the external equipment can change or update the contents. This is the same as the molding machine operation program.

8. The FTP server program 27 can apply restriction to the contents of the internal data of the injection molding machine according to difference in an account name or a password.

As mentioned above, the FTP communication specification is general, and the communication client program thereof is easily available by an external equipment such as a computer mounting an operating system such as the Windows (registered trademark), which saves labor of program creation.

Moreover, the FTP communication specification has very high-level security, and can protect the memories inside the controller from illegal access or the like.

A large amount of data can be exchanged according to a file format without loss by performing communication conforming to the FTP specification.

By setting an IP address peculiar to each injection molding machine, and by forming a communication network form between the injection molding machines, the external equipment can simultaneously communicates with a plurality of injection molding machines, and can perform central management of the internal data of each injection molding machine.

Next, a description will be given of a procedure of acquiring data from the injection molding machine according to the second embodiment of the present invention.

First, in order to designate from the external equipment 30 which is a management apparatus, an operator performs an input of an address of the injection molding machine so as to log in the controller 20 of the injection molding machine. In order to improve security of access to the controller 20, an input of a password or an ID may be requested when logging in. After logging in the controller 20, a list of each file in a directory is viewed and a file to be changed or of which contents are to be checked is selected, and, thereafter, a transmission process to the external equipment 30 is performed. The operator opens the transmitted file on the screen of the external equipment 30 and checks the contents thereof. Molding condition data or logging data is recorded in the transmitted file, and if it is needed to change each data, it is performed by the external equipment 30. Thereafter, it is returned from the external equipment 30 to a position in the controller 20 of the injection molding machine where the original file was saved.

As mentioned above, according to the above-mentioned embodiment, in a molding machine like an injection molding machine, by mounting an FTP server program or an HTTP server program and enabling acquisition or change of the internal data of the molding machine from an external equipment such as a personal computer, the following effects can be obtained.

(1) An external equipment can easily manage molding conditions of a molding machine.

(2) An external equipment can refer to waveform data of a molding machine.

(3) An external equipment can refer to performance value (logging) data of a molding machine.

(4) An external equipment can diagnoses a molding machine by referring to molding machine state data of the molding machine.

(5) An external equipment can change a molding machine operation program of a molding machine.

(6) An external equipment can acquire internal data of a molding machine at high speed, and, the internal data can be transferred from the external equipment to the molding machine.

(7) Since the server program is incorporated in each injection molding machine, a plurality of personal computers 3 can access simultaneously the same injection molding machine.

It should be noted that although the present invention is applied to an injection molding machine in the above-mentioned embodiments, the present invention is not limited to an injection molding machine, and applicable to other molding machines, for example, a molding machine such as an extrusion molding machine.

The present invention is not limited to the specifically disclosed embodiments, and variations and modifications may be made without departing from the scope of the present invention.

What is claimed is:

1. A molding machine comprising:
   a control part incorporating a specific server program; and
   a memory part saving internal data of the molding machine,
   wherein the specific server program converts the internal data into a predetermined format, and the memory part stores files which include the internal data which has been converted into the predetermined format,
   wherein said specific server program transmits said internal data, which has been converted into the predetermined format and stored in said memory part, to a network, and
   wherein said control part further incorporates therein a molding operation program for controlling an operation, and said internal data is converted into HTML file data by the molding machine operation program.

2. The molding machine as claimed in claim 1, wherein said specific server program is an HTTP server program.

3. The molding machine as claimed in claim 2, wherein said internal data is converted into HTML file data by said HTTP server program.

4. The molding machine as claimed in claim 1, wherein said internal data contains at least one kind of molding condition data, performance value data, waveform data, molding machine state data, instruction manual data, and molding machine specification list data.

5. The molding machine as claimed in claim 4, wherein said instruction manual data and said molding machine specification list data are fixed said HTML file data by said HTTP server program, and said molding condition data, said performance value data, said waveform data and said molding state data are converted into said HTML file data by said molding operation program.

6. The molding machine as claimed in claim 1, wherein said internal data is screen data displayed on a display part.

7. The molding machine as claimed in claim 1, wherein said external terminal apparatus is an external computer, and incorporates therein an HTTP server program, and said external computer is provided with a Web browser program.

8. The molding machine as claimed in claim 7, wherein said external terminal apparatus and said control part are capable of performing bi-directional communication therebetween.

9. The molding machined as claimed in claim 8, wherein said molding machine operation program is updated by being sent from said external terminal apparatus to said control part side.

10. A molding machine management system comprising:
    a molding machine having a control part incorporating a specific server program, and a memory part storing internal data of the molding machine and storing files which include the internal data converted into a predetermined format;
    an external terminal apparatus displaying and managing the internal data transmitted from said molding machine; and
    a communication line connecting said molding machine and said external terminal apparatus,
    wherein said specific server program transmits the internal data, which is converted into the predetermined format and stored in said memory part, to said communication line, and
    wherein said control part further incorporates therein a molding operation program for controlling an operation, and said internal data is converted into HTML file data by the molding machine operation program.

* * * * *